United States Patent
Newell et al.

(10) Patent No.: US 8,504,922 B2
(45) Date of Patent: Aug. 6, 2013

(54) ENHANCED USER NAVIGATION TO PREVIOUSLY VISITED AREAS IN A MEDIA ENVIRONMENT

(75) Inventors: Mark Newell, Seattle, WA (US); Jeffrey Margolis, Seattle, WA (US); Will Vong, Hunts Point, WA (US); Bill Flora, Seattle, WA (US); Bojana Ostojic, Seattle, WA (US); Kristina Voros, Redmond, WA (US); Christen Coomer, Seattle, WA (US); Frederic Azera, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 959 days.

(21) Appl. No.: 11/648,526

(22) Filed: Dec. 29, 2006

(65) Prior Publication Data

US 2008/0163127 A1    Jul. 3, 2008

(51) Int. Cl.
G06F 3/00 (2006.01)
G06F 3/048 (2006.01)

(52) U.S. Cl.
USPC .......................................... 715/738; 715/854

(58) Field of Classification Search
USPC .................... 715/853, 863, 738, 854
See application file for complete search history.

(56) References Cited

U.S. PATENT DOCUMENTS

| | | | |
|---|---|---|---|
| 6,091,930 A * | 7/2000 | Mortimer et al. | 434/362 |
| 6,243,091 B1 * | 6/2001 | Berstis | 715/839 |
| 6,253,188 B1 * | 6/2001 | Witek et al. | 705/14.54 |
| 6,445,306 B1 * | 9/2002 | Trovato et al. | 340/825.24 |
| 6,486,895 B1 * | 11/2002 | Robertson et al. | 715/776 |
| 6,509,898 B2 | 1/2003 | Chi et al. | |
| 6,667,751 B1 * | 12/2003 | Wynn et al. | 715/833 |
| 6,772,255 B2 * | 8/2004 | Daynes | 710/200 |
| 6,820,111 B1 | 11/2004 | Rubin et al. | |
| 6,931,604 B2 | 8/2005 | Lane | |
| 6,934,825 B1 * | 8/2005 | Farago et al. | 711/170 |
| 7,036,091 B1 * | 4/2006 | Nguyen | 715/834 |
| 7,039,652 B2 | 5/2006 | Jun et al. | |
| 7,080,172 B1 * | 7/2006 | Schmalz | 710/104 |
| 7,117,440 B2 * | 10/2006 | Gordon et al. | 715/721 |
| 7,233,950 B2 * | 6/2007 | Smith, III | 1/1 |
| 7,242,988 B1 * | 7/2007 | Hoffberg et al. | 700/28 |
| 2002/0006266 A1 | 1/2002 | Yoon et al. | |
| 2002/0047856 A1 * | 4/2002 | Baker | 345/700 |
| 2002/0059244 A1 * | 5/2002 | Bunney et al. | 707/10 |
| 2002/0113803 A1 | 8/2002 | Samra et al. | |

(Continued)

OTHER PUBLICATIONS

Biel et al., "Handling Backtracking in Web Applications", Date: 2004, pp. 388-395, IEEE Computer Society, Washington, DC, USA, http://portal.acm.org/citation.cfm?id=1018420.1019703&coll=GUIDE&dl=GUIDE&CFID=1393249&CFTOKEN=35108007.

(Continued)

Primary Examiner — Doon Chow
Assistant Examiner — Le Nguyen

(57) ABSTRACT

Described herein is technology for, among other things, performing navigation in a media environment. The technology involves the presenting a user with only a portion of the previously visited pages or areas as he or she moves to previously visited pages or areas. As the user moves around the media environment, the movements are recorded for use when requests are received for previously visited areas or pages. As the user moves to previously visited areas redundant pages or areas are skipped. Thus, the user's forward and backward navigation are different and the user moves backward more easily, quickly and efficiently.

20 Claims, 6 Drawing Sheets

(56) References Cited

U.S. PATENT DOCUMENTS

| | | |
|---|---|---|
| 2003/0050975 A1 | 3/2003 | Blaylock |
| 2003/0123726 A1 | 7/2003 | Suh |
| 2003/0208473 A1 | 11/2003 | Lennon |
| 2004/0003346 A1* | 1/2004 | Blaschke et al. ............ 715/501.1 |
| 2004/0128691 A1 | 7/2004 | Egawa et al. |
| 2005/0114796 A1* | 5/2005 | Bast .............................. 715/856 |
| 2005/0132018 A1* | 6/2005 | Milic-Frayling et al. ..... 709/213 |
| 2005/0144251 A1* | 6/2005 | Slate .............................. 709/215 |
| 2005/0188408 A1 | 8/2005 | Wallis et al. |
| 2005/0197141 A1* | 9/2005 | Jiang et al. .................... 455/457 |
| 2005/0251417 A1* | 11/2005 | Malhotra et al. .................. 705/2 |
| 2005/0283804 A1* | 12/2005 | Sakata et al. ..................... 725/52 |
| 2006/0026536 A1* | 2/2006 | Hotelling et al. ............. 715/863 |
| 2006/0059107 A1* | 3/2006 | Elmore et al. .................. 705/64 |
| 2006/0187204 A1* | 8/2006 | Yi et al. ......................... 345/158 |
| 2007/0038941 A1* | 2/2007 | Wysocki et al. ............... 715/748 |
| 2008/0010253 A1* | 1/2008 | Sidhu et al. ....................... 707/3 |

OTHER PUBLICATIONS

Jhaveri, Natalie, "Intermediate and Post-Session Web Page Revisitation Techniques and Tools", Date: Sep. 2004, http://www.cs.uta.fi/research/theses/masters/Jhaveri_Natalie.pdf.

Newfield et al., "Scratchpad: Mechanisms for Better Navigation in Directed Web Searching", Date: 1998, http://www.cs.virginia.edu/papers/scratchpad.pdf.

Waseem Ahmad et al., "Unified Navigation Architecture for Hypertext Applications: A Replacement for Traditional Web Browsers' Navigation Facilities," Proceedings of the IADIS International Conference WWW/Internet (ICWI), Algarve, Portugal, Nov. 5-8, 2003, pp. 419-426.

* cited by examiner

ENHANCED USER NAVIGATION TO PREVIOUSLY VISITED AREAS IN A MEDIA ENVIRONMENT

BACKGROUND

As the world progresses more and more into the digital age, people are acquiring increasingly large collections of different types of digital media. Advances in computer technology have allowed personal computers to become a central hub for the browsing and management of numerous types of digital media. Correspondingly there has been a rise of programs that allow the user to access, maintain and organize their entire media collection in a single location.

With this ever increasing quantity of digital media, the ability to easily and quickly browse one's media collection becomes increasingly important to ensure that a user can quickly get to the media he or she desires and thus has a positive experience. One popular method of navigation in a media environment is a web or internet browsing based model in which objects and menus are arranged in a hierarchical manner. This web browsing model involves recording or storing of the users movements through a media environment as he or she moves forward and backward. As a user follows links from website to website each webpage is stored as the user moves through the internet. Each link followed is a forward movement which adds the new location to the navigation history. After making at least one forward movement the user can make a backward movement which brings them to a previously visited page. Often times this is invoked by pressing a back button that is on screen, a keyboard or remote.

FIG. 1 shows a flowchart of an exemplary navigation in a media environment and an exemplary data structure. The exemplary data structure is can be implemented as a first in last out data structure such as stack 150 with top position 152. Upon entering the media environment browsing program the stack 150 will contain only the root menu page. At step 102, a user is presented with a root menu page upon starting the media environment browsing program. This is similar to how a user is presented with a homepage upon starting a web browser. Further, the root menu page acts like a website in that it has numerous menu items that link the user to various media areas.

The media environment browsing program will store and track the user's navigation history as the user moves around in the media environment. The navigation history will be stored in a last in first out data structure such as stack 150. As the user moves forward each location visited will be added to the top position 152 of stack 150. When the user makes a backward movement, the user is brought to the location that is at the top position 152 of stack 150 and that location is removed from stack 150.

At step 104, the user has selected the menu item on the root menu page corresponding to the video library. Thus, the user is now in the video library where he or she may move around within the video library and select various video sources and videos.

At step 108, the user has decided to move to another media area, so he or she moves to a menu page by pressing an on screen menu button, keyboard key or remote control button. On the menu page the user may browse the various types of media areas that are available and choose another media area. At step 110, the user is at the music library based on selecting the music library on the menu page in the previous step. Once in the music library, he or she may browse the music by numerous pieces of information such as artist, album or genre.

At step 112, the user is brought to a menu page where he or she can again browse and make a selection among the various media areas. At step 114, the user is brought to the recorded TV media area where he or she can browse and select various previously recorded television segments to play. At step 116, the user may decide to choose another media area and so will go to a menu page. From this menu page the user selects the picture library.

At step 118, in the picture library the user can browse various photo albums and view photos based on date and other information. The top position 152 of exemplary stack 150, now contains all previously visited locations with the picture library in the top position 152.

At step 120 the user was in the picture library but has decided that he or she wishes to go to a previous area or move backward. This decision may be for a variety of reasons including changing a currently playing media and selecting a new media to play in a previously visited area. In order to move backwards in the navigation history which was stored as each media area was visited previously; the user will press an on screen back button, keyboard key or remote control button. It is appreciated that in some embodiments, upon making a backward movement the information stored in the top position 152 of stack 150 will be removed when the user is brought to the location stored in top position 152.

At step 122, the user is brought to the menu page which is the first location in the navigation history after the picture library. This is the menu page from which the user previously selected the picture library. Upon moving to the menu page, the information associated with the menu page will be remove from stack 150 and top position 152 will now contain recorded TV location information.

At step 124, the user again presses the back button and is brought back to the recorded TV area which is the next area in the navigation record. The top position 152 will now be occupied by a menu page which was previously used to select the recorded TV area. Within the recorded TV area the user will again be able to browse around in this area and select a new or previous media to play.

At step 126, the user again presses the back button and is brought back to a menu page which was previous visited from which the user previously selected the recorded TV media area. The top position 152 of stack 150 will now contain the music library. Like with the media areas, the user may browse around the menu page and still be able to move backwards.

At step 128, the user has again moved backward and now is in the previously visited music library. The top position 152 of stack 150 now contains a menu page which was previously used to select the music library. At step 130, the user moves backward and is brought to the menu page that during forward navigation was used to select the music library. The top position 152 now contains the video library.

At step 132, the user is brought to the Video library media area that was the first selection the user previously made from the root menu page. The top position 152 of stack 150 will now contain the root menu page. At step 134, the user makes a final backward navigation which brings him or her to the root menu page. This is the menu page the user was presented upon opening the media environment browsing program.

One drawback of using this model is that when the user desires to move to previously visited areas that was several locations prior, he or she must move through each and every prior location. As illustrated in the above example of backward navigation, the user must move through each and every intervening menu page that was used to select a media area. Thus, as the user moves backward though numerous pages to get to desired page, the movement may become tedious, and the user may become frustrated by this cumbersome method associated with navigating backwards through their previous selections.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, performing navigation in a media environment. The technology may be implemented via an application for browsing various types of media or a web browser. The technology involves the storing of a user's navigation as he or she moves forward through the media environment and then allowing the user to move backward through the previous locations without having to visit each and every previously visited location. The areas skipped may include menu pages that were used to select different media areas in the media environment.

Thus, embodiments provide technology for performing navigation in a media environment. The techniques described herein provide for efficient navigation and movement through a media environment. Such technology is ideal for home computers and other devices capable of supporting a wide variety of media. Because of the efficiency of the technology described herein, the user may navigate around in the media environment more quickly, easily and efficiently.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Figure 1:
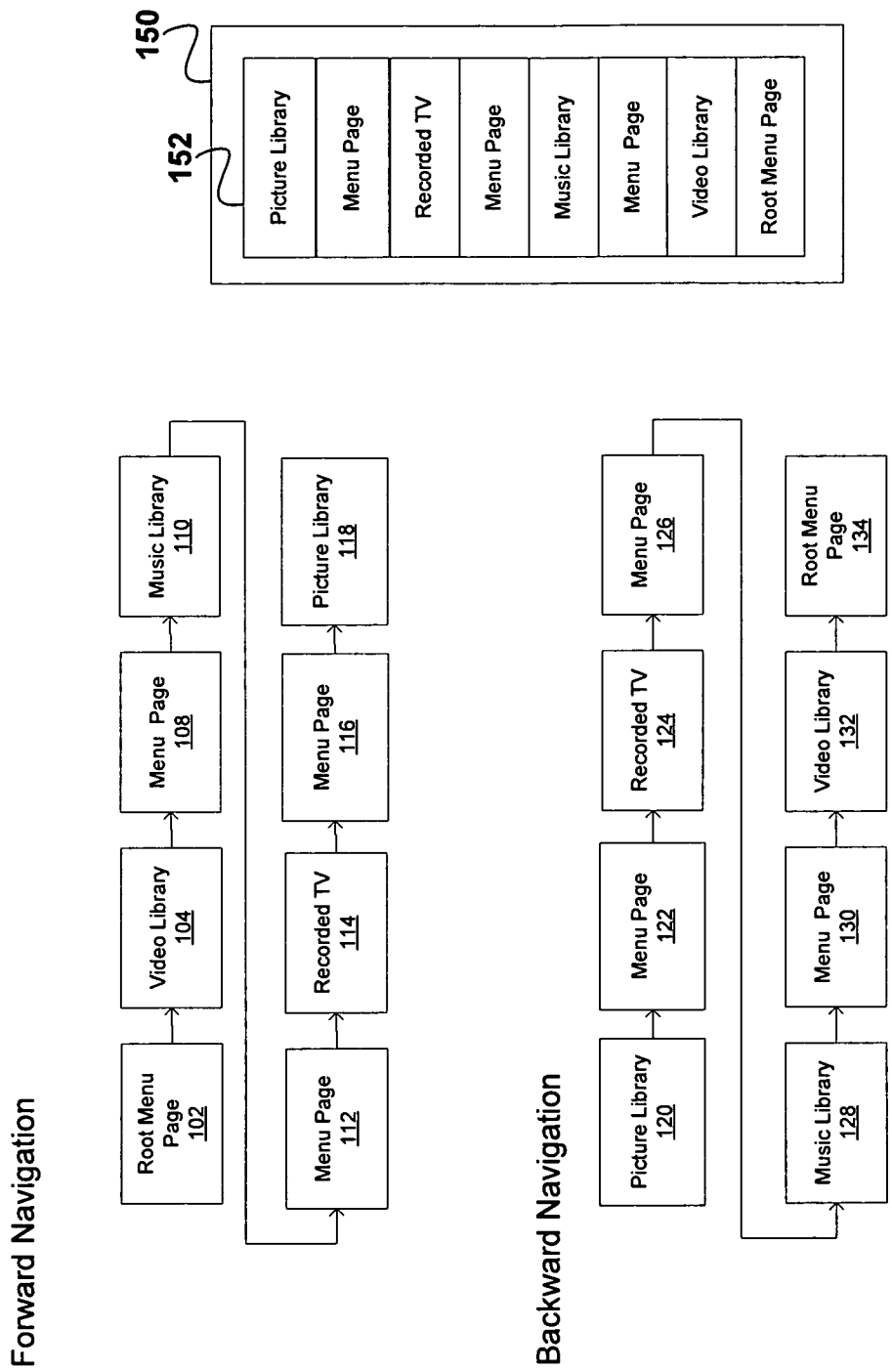
FIG. 1 is a flowchart of exemplary forward and backward navigation and a block diagram of a data structure in accordance with an embodiment.

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, usage, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Described herein is technology for, among other things, performing navigation in a media environment. The technology may be implemented via an application or a web page. The technology involves keeping track of the places a user visits as he or she moves throughout a media environment and upon receiving requests from the user to visit previous locations, the user is presented with a portion of the locations that have been previously visited. In one embodiment, this portion of locations may include all those locations that are not menu pages or menu areas.

Figure 2:
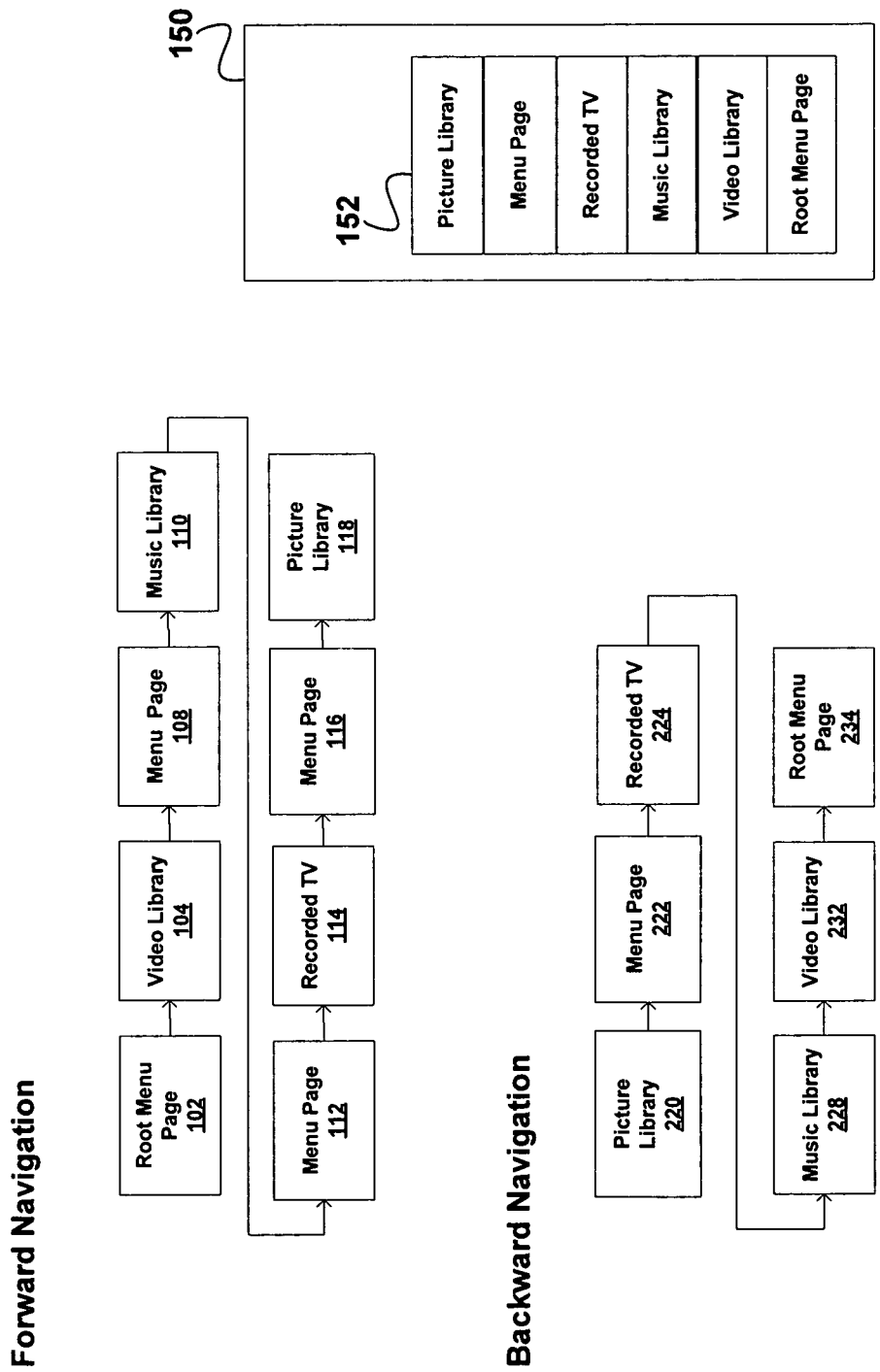
FIG. 2 is a flowchart of exemplary forward and backward navigation and a block diagram of a data structure in accordance with an embodiment.

For example, FIG. 2 shows an exemplary forward and backward navigation and exemplary data structure in accordance with one embodiment. The forward navigation is the same as previously presented during the discussion of FIG. 1. At step 220 the user is still in the picture library but has decided he or she wishes to go to a previous area. This decision may be for a variety of reasons including changing a currently playing media and selecting a new media to play in a previously visited area. In order to move backwards in the navigation history which was stored at each media area visited previously, the user will press an on screen back button, keyboard key or remote control button. Stack 150 tracks and stores the navigation as the user moves through the media environment. The stack 150 is shown with the current contents of the stack with the picture library in top position 152. It is appreciated that in some embodiments, the information stored in top position 152 of stack 150 will be removed when the user is presented with the location that was stored in top position 152 of stack 150.

At step 222, the user is brought to the menu page which is the first location in the navigation history and now in top position 152 of stack 150. This is the menu page from which the user previously selected the picture library.

At step 224, the user again presses the back button and is brought back to the recorded TV area which is the next area in the navigation record. Within the recorded TV area the user will again be able to browse around in this area and select a new or previous media to play. In one embodiment, the information stored in stack 150 will be used to bring the user directly to the exact location within in the recorded TV such as a sitcom series.

At step 228, the user has again moved backward and now is in the previously visited music library. The top position 152 of stack 150 will contain the video library. The technology described herein has allowed the user to skip the menu page that was used to move between the music library and the recorded TV area during the forward navigation.

At step 232, the user is brought to the Video library media area that was the first selection the user previously made from the root menu page. Again, the user moved backward from one media area to another media area without having to visit the menu page that was visited during the forward navigation. The stack 150 now only contains the root menu page which also occupies the top position 152.

At step 234, the user makes a final backward navigation which brings him or her to the root menu page. This is the menu page the user was presented upon opening the media environment browsing program. Stack 150 may now be empty or contain only the root menu page. In one embodiment, if the stack ever becomes empty a root menu page will be added to stack 150.

Thus, pressing a back button does not automatically traverse the exact same pages or menus that the user had previously navigated. By skipping some or all of the redundant pages or menus, the backwards navigation can be performed faster, simpler, and more efficiently.

Figure 3:
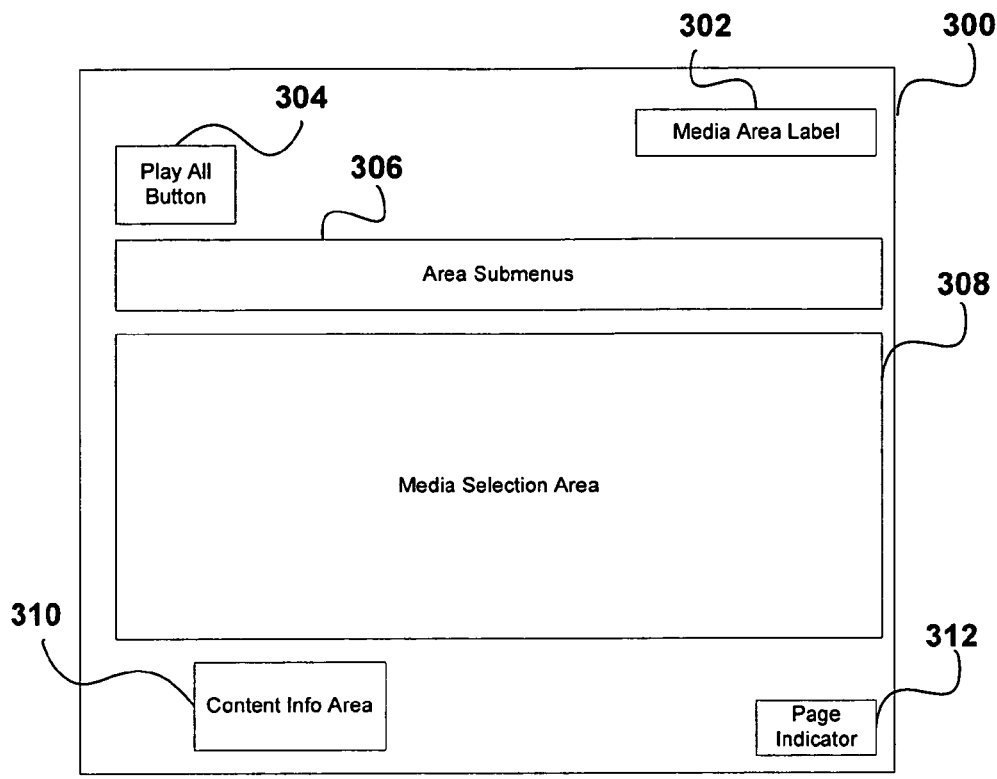
FIG. 3 is a block diagram of an exemplary graphical user interface for a media area in accordance with an embodiment.

With reference to FIG. 3, an exemplary media area graphical user interface 300 is illustrated. Media area graphical user interface 300 allows the user to make selections of specific media within a media area. It is appreciated that elements may be added or removed for other media areas and layout may change accordingly. Media area graphical user interface 300 includes: media area label 300, play all button 304, area submenus 306, content selection area 308, content info area 310, and page indicator 312.

By way of example, the media area graphical user interface for an exemplary music library will be described herein to aid in the description of the various elements. Media area label 300 contains the name of the media area, which in the example is music library. Play all button 304 allows the user to play all the content in a media area, such as all the music in the music library. Area submenus 306 allow the user to move around and make selections in a media area. For example, in the music library area submenus 306 may contain: albums, artists, genres, songs, playlists, composers, years and album artists.

Content selection area 308 allows the user to select various media based on the selection in area submenus 306. For example, if the user has selected the area submenu 306 corresponding to albums then content selection area 308 contains all albums and album art so the user may select an album to play or view the songs within that album. Content info area 310 will contain information related to the currently selected item in content selection area 308. For example, in the music library if the user has selected a music album, content information area 308 may display such information as the length of the album, the artist, the number of tracks and the year the album was released.

Page indicator 312 displays the page number based on the current area submenu 306 and the number of items displayed in content selection area 308. Again referring to the example of the music library, if albums submenu is selected in the area submenus 306 then based on the number of albums and the number of items that can be displayed in content selection area 308, page indicator 312 will display a number of pages of albums that the user can select from.

Figure 4:
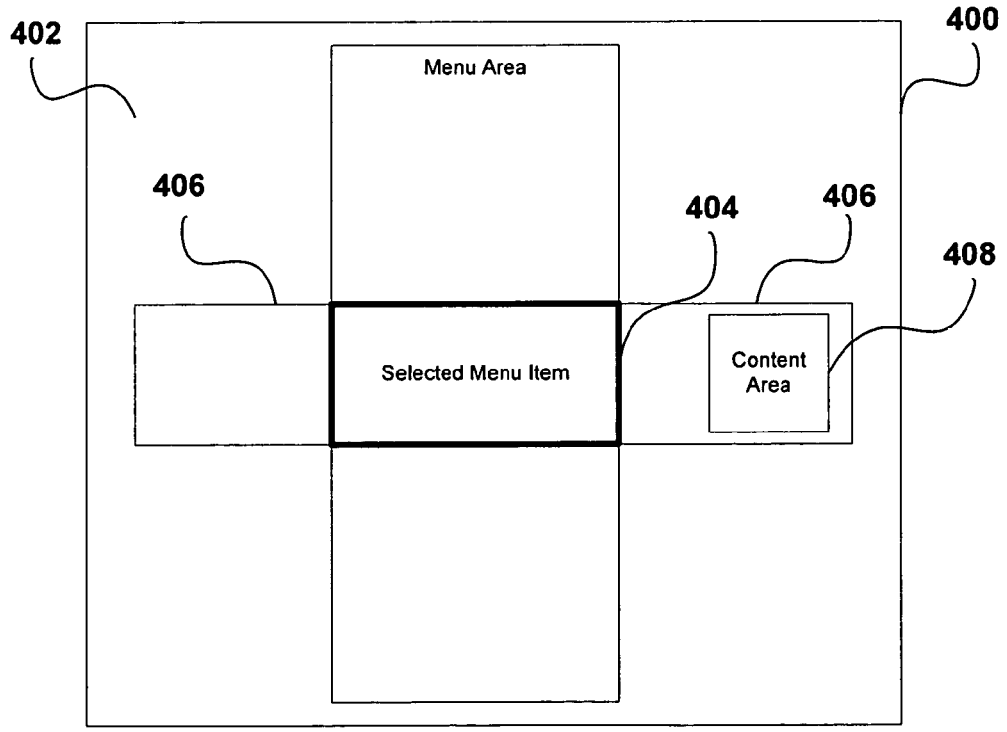
FIG. 4 is a block diagram of an exemplary graphical user interface for a menu page in accordance with an embodiment.

With reference to FIG. 4, an exemplary menu page graphical user interface 400 is illustrated. It is appreciated that elements may be added or removed from menu pages or areas and the layout may change accordingly. Menu page graphical user interface 400 contains: menu area 402, selected menu item 404, submenu 406 and content area 408.

Menu area 402 contains menu items corresponding to each media area that the user may visit. These can include: video library, music library, recorded TV, picture library, sports and online media. Selected menu item 404 is the currently selected menu item corresponding to a media area and may be enlarged or highlighted. When the user moves backward to a menu page or presses the menu button, selected menu item 404 may be the menu item corresponding to the media area the user was previously in. For example, if the user is in the music library and presses the menu button, selected menu item 404 will be the music library menu item.

Submenu 406 will contain menu items based on selected menu item 404. For example, if selected menu item 404 was the TV and movies media area, submenu 406 might contain menu items such as: recorded TV, live TV, TV guide, movie guide, play DVD or search. Submenu 406 may further contain content area 408.

Content area 408 contains information or video of the currently playing media. For example, if a video is currently playing when the user brings up a menu page, the video may continue to play in reduced size in content area 408. Alternatively, if music is currently playing a progress bar and corresponding time remaining or album art may be displayed. In another embodiment, depending on the type of media playing, for example video, menu page graphical user interface 400 may be displayed with a degree of transparency so the video may still be visible while continuing to playing at full size.

Figure 5:
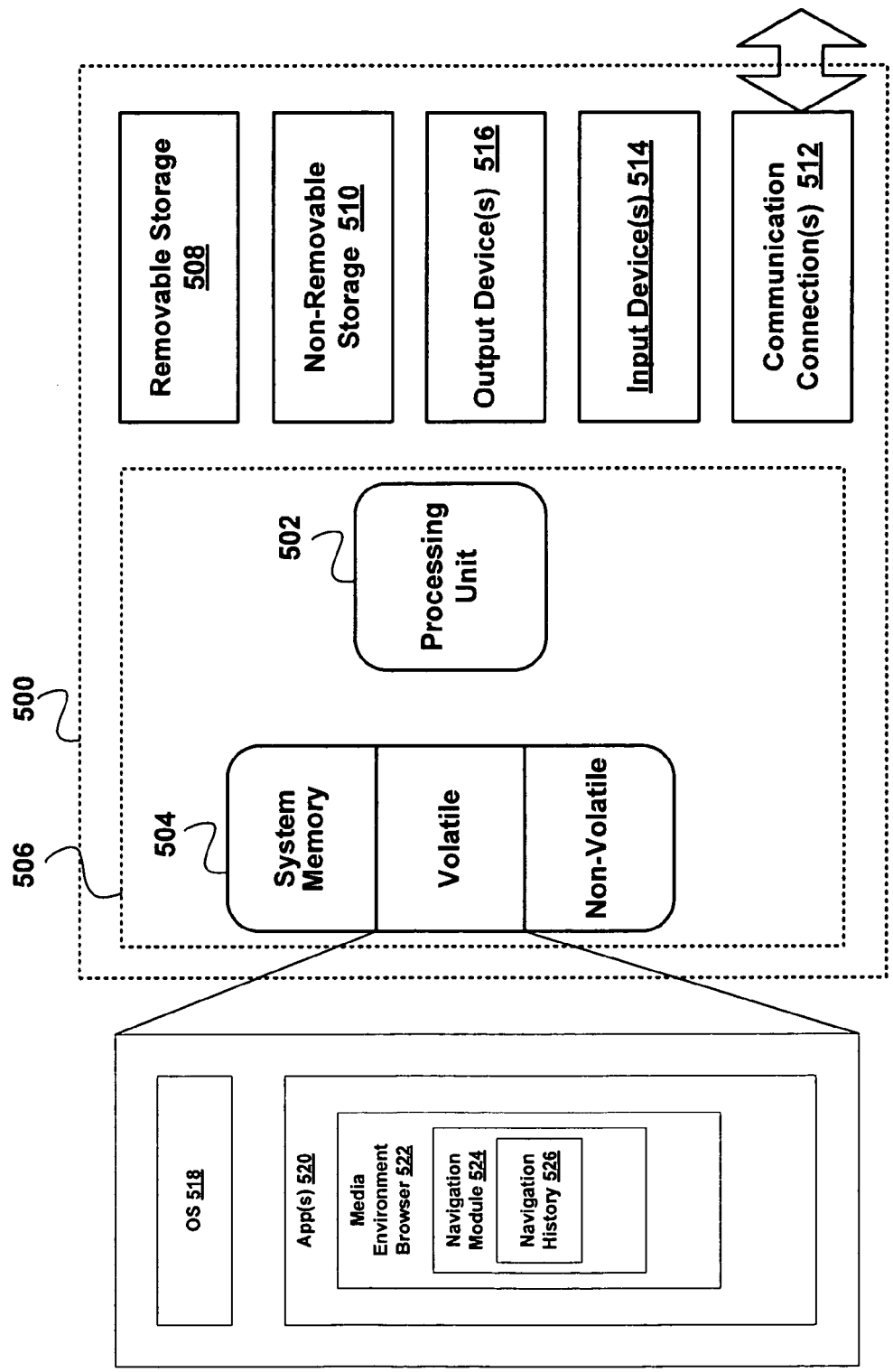
FIG. 5 is a block diagram of an exemplary computing system environment for implementing embodiments.

With reference to FIG. 5, an exemplary system for implementing embodiments includes a general purpose computing system environment, such as computing system environment 500. In its most basic configuration, computing system environment 500 typically includes at least one processing unit 502 and memory 504. Depending on the exact configuration and type of computing system environment, memory 504 may be volatile (such as RAM), non-volatile (such as ROM, flash memory, etc.) or some combination of the two. This most basic configuration is illustrated in FIG. 5 by dashed line 505. System memory 504 among other things, includes Operating System 518 (OS) and Applications 520. In one embodiment, Applications 520 will include a Media Environment Browser 522 for browsing and managing various types of media. These various types of media may include, but are not limited to, digital audio, home videos, downloaded videos, radio broadcasts, television broadcasts, recorded television, digital versatile discs (DVDs), programming guides and photographs. Media environment browser 522 may contain a user interface (UI) that has minimal buttons and the buttons and text that are sized appropriately for being viewed on a television screen from a distance.

Among other things, Media Environment Browser 522 will include Navigation Module 524 which is responsible for facilitating navigation in a media environment. This can include coordinating playback with other modules, controlling playback and changing the UI based on previously visited locations. Navigation Module 524 further includes a Navigation History 526, which in one embodiment is a data structure for storing locations as a user moves around in a media environment. Navigation History 526 may be implemented with a first in last out data structure such as a stack. Navigation Module 524 will control and maintain the Navigation History 526 as the use navigates the media environment. In doing so Navigation Module 524 may remove or skip locations in Navigation History 526 when presenting the user with previously visited locations.

Additionally, computing system environment 500 may also have additional features/functionality. For example, computing system environment 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and nonremovable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 512 may also allow computing system environment 500 to communication with devices including, but not limited to, TV tuners, DVD players and recorders, digital cameras, web cameras, digital video recorders, radio tuners and programming guides.

Computing system environment 500 may also have input device(s) 514 such as a keyboard, mouse, pen, voice input device, touch input device, remote control, etc. Output device(s) 516 such as a display, speakers, printer, etc. may also be included. All these devices are well known in the art and need not be discussed at length here.

The claimed subject matter is described in terms of these example environments. Description in these terms is provided for convenience only. It is not intended that the invention be limited to application in this example environment. In fact, after reading the following description, it will become apparent to a person skilled in the relevant art how to implement the claimed subject matter in alternative embodiments.

Figure 6:
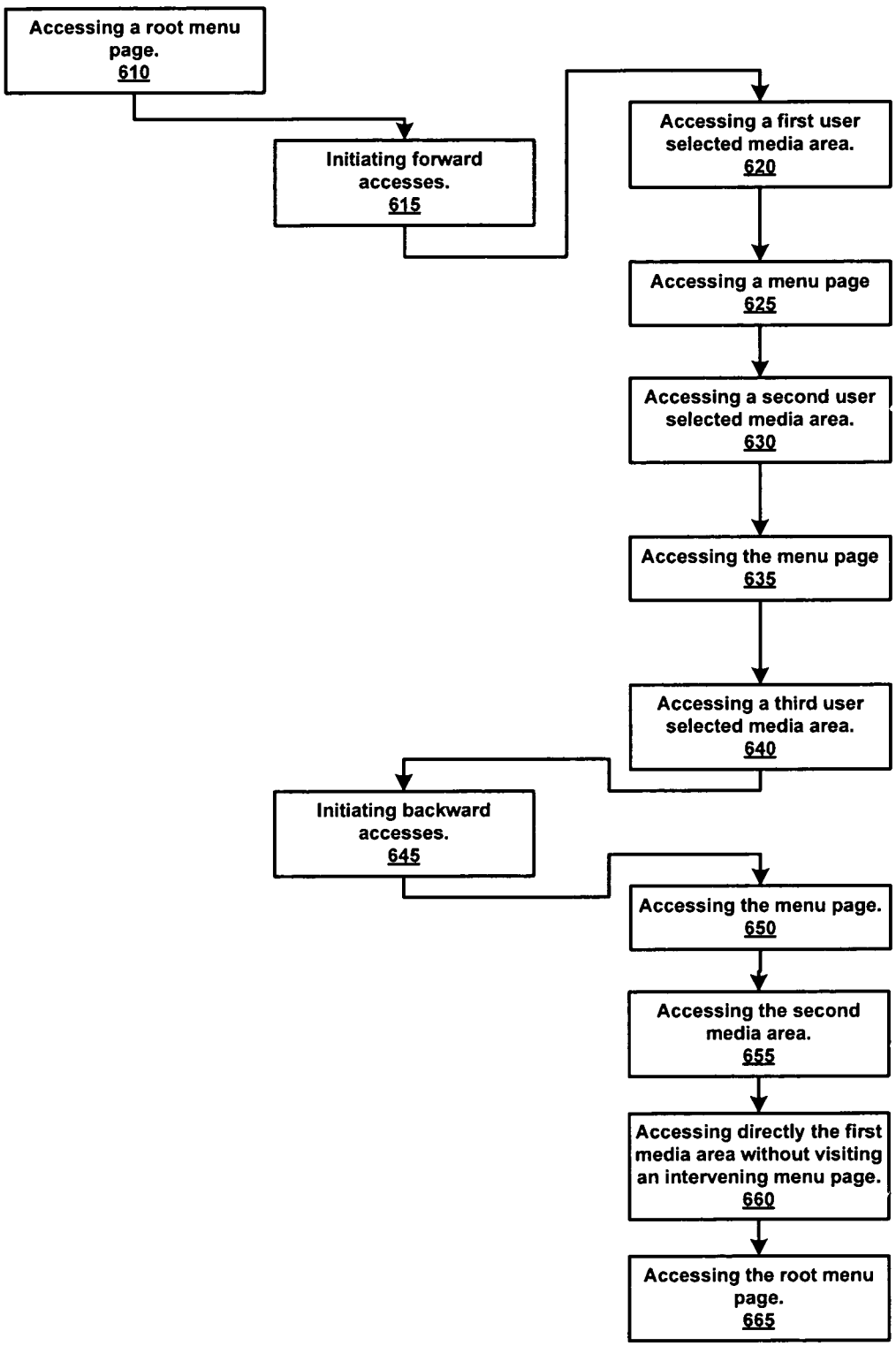
FIG. 6 is a flowchart of a process for performing user navigation in a media environment, in accordance with an embodiment.

FIG. 6 shows a flowchart of a process 600 for performing navigation in a media environment in accordance with an embodiment. Process 600 may be implemented on the operating environments described above. Process 600 is well-suited to be stored as instructions on a computer-readable medium. In an exemplary embodiment, process 600 operates on a personal computer. It is appreciated that not all steps of process 600 are necessary for the general goal of process 600 to be achieved. Moreover, it is appreciated that additional steps may also be included in process 600 in accordance with alternative embodiments.

Process 600 begins at step 610, where a root menu page is accessed. The user may be presented with the root menu page, as described above and illustrated by FIG. 4, upon starting a media browsing application. It is appreciated that a media environment may include various different types of media including, but not limited to, digital audio, home videos, downloaded videos, radio broadcasts, television broadcasts, recorded television, digital versatile discs (DVDs), programming guides, and photographs. The media environment browser may contain a user interface (UI) that has minimal buttons and the buttons and text that are sized appropriately for being viewed on a television screen from a distance.

At step 620, the user initiates forward accesses as he or she moves through the media environment selecting various media areas. As the user selects and moves through the media environment the navigation history will be recorded. This information can be stored in a first in last out data structure such as a stack. In one embodiment, the data structure used to record the locations may have a fixed number of slots or spaces with which to store location information. The technology described herein can be implemented by not storing certain or removing certain locations which will not be presented later to the user.

At step 625, a first user selected media area is selected. Within this area the user may move around from broad categories to more specific media items. As an example built upon herein, a user may first select the music library media area. Then within the music library the user may select an artist then an album and finally a song. In one embodiment, as the user moves around within the music library the specific area may be recorded. For example, the specific album that the user is currently viewing maybe stored along with the music library in the location history. After the user has made a selection in a media area, he or she may be brought back to the main page of the corresponding media area automatically. For example, if the user selects a song from an album in the music library or the whole album to play, the user may automatically be brought back to the album selection page.

At step 625, the user accesses a menu page. The user may access the menu page via a menu button that is on screen or on a remote or keyboard. This menu page allows the user to browse and select other media areas. In one embodiment, the menu page may contain a content area for displaying current playing media and in some cases the playing media at a reduced size. For example, if the music selected by the user previously is still playing the content area may display the album art or a progress bar corresponding to the position in the currently playing song.

At step 630, the user accesses a second user selected media area. For example, the user may now access the photo library and move around in the photo library browsing and selecting various photos for a slide show. In one embodiment, this slide show plays concurrently with the music previously selected.

At step 635, the user again accesses the menu page. The content area of the menu page may now display a small picture or thumbnail of the current photo of the slide show and other information about the photo such as the date. Concurrently, the music may continue to play. Menu items may be available or unavailable based on the presence of the corresponding media areas in the navigation history. The menu page may have focus or selection along with visual effects such as highlighting placed on the menu item corresponding to the last media area visited. Referring again to the previous example, the focus may be on the photo library menu item and if the user were to press the select button he or she will be brought back to the photo library. The menu page may further allow currently playing media to be visible while user is presented with a menu page. This may be done by making the menu page relatively transparent to allow video or photographs to be seen behind the menu.

At step 640, the user accesses a third user selected media area based on a selection on the menu page. Once in the media area, the selections a user makes in certain areas may cause a currently playing media to cease. Building further on the example, if music tracks are still currently playing and the user enter the video library and selects a home video to play; the music will stop as soon as the home video starts to play.

At step 645, the user initiates backward access. This backward movement allows the user move back though previously visited media areas and menu pages. The user can initiate the backward accesses by pressing the back button on screen or a back button on a remote or keyboard. Alternatively, the back button and menu buttons may not be visible during media playback but only upon user action. At Step 650, the first location in the backward accesses will be a menu page. This location corresponds to the last menu page that the user access prior to selecting the media area or experience where the user initiated the backward movement. Like with forward accesses, information stored in the user's location history can be used to place focus or selection along with visual effects such as highlighting on the menu item corresponding to the user's previous location.

At step 655, the user accesses the second media area via backward access. Referring back to the above example, the user will now in the photo library. The audio of the home video that previously selected may still be playing in the background. In another embodiment, the second media area may be accessed directly without an intervening menu page as described in the previous step.

At step 660, the user accesses directly the first media area without first visiting an intervening menu page. Referring again to the previous example the user will now have moved from the photo library directly to the music library. It is appreciated that the step of accessing the menu page that was used to select the photo library after being in the music library is not required. In another embodiment, locations or media areas corresponding to media that has finished playing or resulted in an error may be removed from the navigation history. Thus, the technology allows the user to move back through previous media areas without having to access intervening menu pages.

At 665, the user accesses the root menu page. Referring to the previous example, the user will now be back at the root menu page where he or she began moving through the media environment. In one embodiment, the record keeping of the locations the user has visited will contain a root menu page in the last spot in the navigation history. A root menu page may also be placed in the location history whenever the location history becomes empty.

Figure 7:
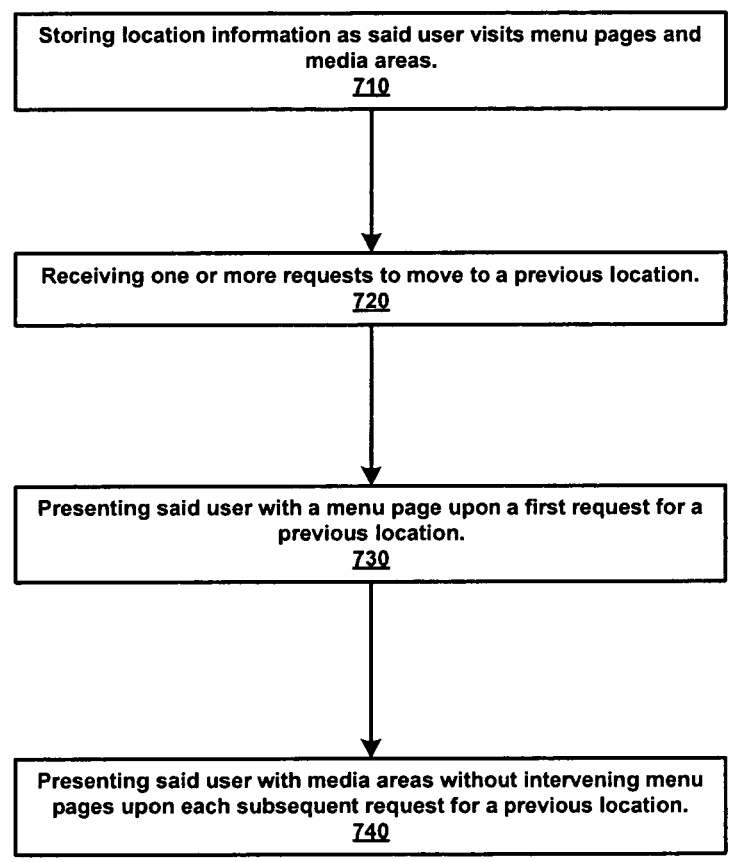
FIG. 7 is a flowchart of a process for performing user navigation in a media environment, in accordance with an embodiment.

FIG. 7 illustrates a flowchart of a process 700 for facilitating user navigation in a media environment, in accordance with an embodiment. It is appreciated that not all steps of process 700 are necessary for the general goal of process 700 to be achieved. Moreover, it is appreciated that additional steps may also be included in process 700 in accordance with alternative embodiments.

Process 700 begins at step 710, where location information is stored as the user visits menu pages and media areas throughout a media environment. The technology described herein can be further implemented by not storing certain or removing certain locations which will not be presented later to the user. Additional information about where the user specifically is within a media area maybe stored as the user moves around with that area which can be later used when the user revisits that media area. For example, if the user is in the music library browsing an album such information may be recorded and used to bring the user to that album when he or she revisits the music library.

After the user has made a selection in a media area, he or she may be brought back to the main page of the corresponding media area automatically. For example, if the user selects a song from an album in the music library or the whole album to play, the user may automatically be brought back to the album selection page.

The navigation history can be stored in any number of data structures, including first in last out structures such as a stack. In one embodiment the stack may have a fixed number of slots or locations for storing a user's navigation history.

At step 720, one or more requests to move to a previous location are received from a user. For example, this may be initiated by the user pressing a back button on a remote or clicking an onscreen back button. In one embodiment, the request to move backward may cause the current location to be saved. As the user makes requests to move to previous locations, the currently playing media may continue to play until a new media is selected.

At step 730, the user will be presented with a menu page upon a first request for a previous location. In many cases, a menu page will have the previously visited media area selected or in focus. Referring again to the previous example, the focus or selection may be on the photo library menu item and if the user were to press the select button he or she will be brought back to the photo library. Alternatively, menu items may be available or unavailable based on the presence of the corresponding media areas in the navigation history.

The menu page may contain a content area for displaying a current playing media. For example, if the music selected by the user previously is still playing the content area may display the album art or a progress bar corresponding to the position in currently playing song. In another embodiment, a media area may be accessed directly upon the first request for a previous location without an intervening menu page. The menu page may further allow currently playing media to be visible while user is presented with a menu page. This may be done by making the menu page relatively transparent to allow video or photographs to be seen behind the menu. In another embodiment, a media area may be accessed directly upon the first request for a previous location without an intervening menu page.

At Step 740, the user will be presented with previously visited media areas without intervening menu pages upon each subsequent request for a previous location. For instance, the user will not be presented with the menu pages that may have been visited as the user moved though different media areas. In another embodiment, locations or media areas corresponding to media that has finished playing or resulting in an error may be not presented as the user moves through the previously visited areas. It is appreciated that this allows the user to move quickly though past media experiences. In one embodiment, information will be stored corresponding to the exact location in a media area that the user was at prior to moving to a menu page. Thus, if the user had previously been looking at the songs of a particular album when the user arrives again at the music library he or she will be presented with the same particular album screen that he or she had visited previously. Once the user has been through all previously visited locations, the user will be presented with a root menu page. In one embodiment, a root menu page will be placed in the location history if it becomes empty.

The embodiments described above relate to the removal or skipping of menu pages during backward access. It is appreciated that in other embodiments, locations may be inserted into or removed from both forward and backward navigation histories The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   initiating, on a computer, a media environment browsing program that facilitates navigation to various types of media stored on the computer;
   presenting, by the media environment browsing program, a menu page that contains a content area and selectable menu items corresponding to media areas that can be accessed by the user, wherein the media areas include different types of libraries for browsing and selecting videos, music, and photographs stored on the computer, and wherein each media area provides a menu button for accessing the menu page;
   storing a navigation history in response to the user initiating forward accesses via the selectable menu items of the menu page and the menu button of each media area, wherein:
      the forward accesses include at least one visit to each media area from the menu page and at least one visit from each media area to the menu page via the menu button of each media area,
      the navigation history is stored in a last in first out data structure with a location of a last media area visited occupying a top position of the data structure,
      the navigation history allows a first backward access from the last media area visited to a location corresponding to a last visit to the menu page, and
      locations corresponding to all other visits to the menu page prior to the last visit to the menu page are removed from the data structure so that intervening menu pages that were used to move between other previously visited media areas during the forward accesses are skipped during backward accesses;
   presenting a user interface corresponding to the last media area visited for allowing the user to browse and select media items from a library;
   playing a media item at the last media area visited in response to selection of the media item by the user;
   removing the location of the last media area visited from the top position of the data structure in response to the user initiating the first backward access by pressing a back button so that the location corresponding to the last visit to the menu page occupies the top position of the data structure;
   presenting, by the media environment browsing program, the menu page with focus placed on the menu item corresponding to the last media area visited and with the media item continuing to play in the content area of the menu page;
   removing the location corresponding to the last visit to the menu page from the top position of the data structure in response to the user initiating a second backward access by pressing the back button so that a location corresponding to a previously visited media area occupies the top position of the data structure; and
   presenting a user interface corresponding to the previously visited media area, wherein the navigation history allows another media area to be directly accessed from the previously visited media area by pressing the back button to initiate a third backward access.

2. The method of claim 1, further comprising:
   loading a root menu page into the data structure when the data structure becomes empty.

3. The method of claim 1 further comprising:
   placing focus on the menu item corresponding to the last media area visited by enlarging the menu item corresponding to the last media area visited on the menu page.

4. The method of claim 1, wherein the media item is played in reduced size in the content area of the menu page.

5. The method of claim 1, wherein a currently playing media item continues to play in the background until a new media item is selected.

6. The method of claim 1, wherein the second backward access brings the user to an exact location within the previously visited media area that was viewed by the user prior to moving to the menu page.

7. A computer-readable memory storing computer-executable instructions stored thereon that, when executed, cause a computing device to perform steps comprising:
   initiating a media environment browsing program that facilitates navigation to various types of media stored on the computing device;
   presenting, by the media environment browsing program, a menu page that contains a content area and selectable menu items corresponding to media areas that can be accessed by the user, wherein the media areas include different types of libraries for browsing and selecting videos, music, and photographs stored on the computing device, and wherein each media area provides a menu button for accessing the menu page;
   storing a navigation history in response to the user initiating forward accesses via the selectable menu items of the menu pare and the menu button of each media area, wherein:

the forward accesses include at least one visit to each media area from the menu page and at least one visit from each media area to the menu page via the menu button of each media area, the navigation history is stored in a last in first out data structure with a location of a last media area visited occupying a top position of the data structure, the navigation history allows a first backward access from the last media area visited to a location corresponding to a last visit to the menu page, and locations corresponding to all other visits to menu page to the last visit to the menu page are removed from the data structure so that intervening menu pages that were used to move between other previously visited media areas during the forward accesses are skipped during backward accesses;

presenting a user interface corresponding to the last media area visited for allowing the user to browse and select media items from a library;

playing a media item at the last media area visited in response to selection of the media item by the user;

removing the last media area visited from the top position of the data structure in response to the user initiating the first backward access by pressing a back button so that the location corresponding to the last visit to the menu pare occupies the top position of the data structure;

presenting, by the media environment browsing program, the menu page with focus placed on the menu item corresponding to the last media area visited and with the media item continuing to play in the content area of the menu page;

removing the location corresponding to the last visit to the menu pare from the top position of the data structure in response to the user initiating a second backward accesses by pressing the back button so that a location corresponding to a previously visited media area occupies the top position of the data structure; and presenting a user interface corresponding to the previously visited media area, wherein the navigation history allows another media area to be directly accessed from the previously visited media area by pressing the back button to initiate a third backward access.

8. The computer-readable memory of claim 7, further comprising computer-executable instructions for: loading a root accessing directly said second media area without an intervening menu page into the data structure when the data structure becomes empty.

9. The computer-readable memory medium of claim 7 further comprising computer-executable instructions for: placing focus on the menu item corresponding to the last media area visited by enlarging the menu item corresponding to the last media visited on the menu page.

10. The computer-readable storage memory of claim 7, wherein the media item is played in reduced size in the content area of the menu page.

11. The computer-readable memory of claim 7, wherein a currently playing media item continues to play in the background until a new media item is selected.

12. The computer-readable memory of claim 7, wherein the second backward access brings the user to an exact location within the previously visited media area that was viewed by the user prior to moving to the menu page.

13. A computing device comprising:
a processor for executing computer-executable program instructions; and memory storing computer-executable program instructions for:

initiating a media environment browsing program that facilitates navigation to various types of media stored on the computing device;

presenting, by the media environment browsing program, a menu page that contains a content area and selectable menu items corresponding to media areas that can be accessed by the user, wherein the media areas include different types of libraries for browsing and selecting videos, music, and photographs stored on the computing device, and wherein each media area provides a menu button for accessing the menu page;

storing a navigation history in response to the user initiating forward accesses via the selectable menu items of the menu page and the menu button of each media area, wherein:

the forward accesses include at least one visit to each media area from the menu page and at least one visit from each media area to the menu page via the menu button of each media area, the navigation history is stored in a last in first out data structure with a location of a last media area visited occupying a top position of the data structure, the navigation history allows a first backward access from the last media area visited to a location corresponding to a last visit to the menu page, and locations corresponding to all other visits to the menu page prior to the last visit to the menu page are removed from the data structure so that intervening menu pages that were used to move between other previously visited media areas during the forward accesses are skipped during backward accesses;

presenting a user interface corresponding to the last media area visited for allowing the user to browse and select media items from a library;

playing a media item at the last media area visited in response to selection of the media item by the user;

removing the location of the last media area visited from the top position of the data structure in response to the user initiating the first backward access by pressing a back button so that the location corresponding to the last visit to the menu page occupies the top position of the data structure;

presenting, by the media environment browsing program, the menu page with focus placed on the menu item corresponding to the last media area visited and with the media item continuing to play in the content area of the menu page;

removing the location corresponding to the last visit to the menu page from the top position of the data structure in response to the user initiating a second backward access by pressing the back button so that a location corresponding to a previously visited media area occupies the top position of the data structure; and presenting a user interface corresponding to the previously visited media area, wherein the navigation history allows another media area to be directly accessed from the previously visited media area by pressing the back button to initiate a third backward access.

14. The computing device of claim 13, wherein the memory further stores computer-executable program instructions for:

loading a root menu page into the data structure when the data structure becomes empty.

15. The computing device of claim 13, wherein the memory further stores computer-executable program instructions for:
  placing focus on the menu item corresponding to the last media area visited by enlarging the menu item corresponding to the last media area visited on the menu page.

16. The computing device of claim 13, wherein the media item is played in reduced size in the content area of the menu page.

17. The computing device of claim 13, wherein a currently playing media item continues to play in the background until a new media item is selected.

18. The computing device of claim 13, wherein the second backward access brings the user to an exact location within the previously visited media area that was viewed by the user prior to moving to the menu page.

19. The computing device of claim 13, wherein the videos comprise recorded television segments.

20. The computer-readable storage device of claim 7, wherein the videos comprise recorded television segments.

* * * * *